United States Patent [19]

Sorenson

[11] Patent Number: 5,022,151

[45] Date of Patent: Jun. 11, 1991

[54] METHOD OF MAKING AN AEROSOL NOZZLE ASSEMBLY

[75] Inventor: J. Frank Sorenson, Redlands, Calif.

[73] Assignee: Baumac International, Mentone, Calif.

[21] Appl. No.: 474,201

[22] Filed: Jan. 19, 1990

Related U.S. Application Data

[63] Continuation of Ser. No. 302,026, Jan. 25, 1989, abandoned.

[51] Int. Cl.[5] .............................................. B21D 53/00

[52] U.S. Cl. ................................. 29/890.143; 29/432; 29/515; 29/520; 29/890.144; 29/891

[58] Field of Search ...................... 29/890.14, 890.143, 29/890.144, 891, 432, 515, 520; 239/550, 600

[56] References Cited

U.S. PATENT DOCUMENTS

| | | | |
|---|---|---|---|
| 978,597 | 12/1910 | Kennedy | 29/890.14 |
| 1,177,884 | 4/1916 | Molesta et al. | 239/600 |
| 2,166,300 | 7/1939 | Komar | 29/890.143 |
| 2,732,882 | 11/1955 | Barnett | 239/550 |
| 2,780,494 | 2/1957 | Keser | 239/550 |
| 2,859,870 | 11/1958 | Hitz | 29/890.14 |
| 3,038,484 | 6/1962 | Smith | 29/890.14 |
| 3,214,102 | 10/1965 | Meyer | 239/550 |
| 3,871,063 | 3/1975 | Halvorsen | 29/890.143 |
| 3,947,940 | 4/1976 | Augustine | 29/890.143 |
| 4,122,590 | 10/1978 | Spencer | 29/890.144 |
| 4,435,891 | 3/1984 | Nicholson | 29/890.143 |
| 4,582,259 | 4/1986 | Hoover et al. | 29/890.143 |
| 4,712,809 | 12/1987 | Legris | 29/890.14 |
| 4,732,329 | 3/1988 | Martin | 239/547 |

*Primary Examiner*—Howard N. Goldberg
*Assistant Examiner*—I. Cuda
*Attorney, Agent, or Firm*—Knobbe, Martens, Olson & Bear

[57] ABSTRACT

A water aerosol or fog-generating system comprises a pipe having a plurality of atomizing nozzles threaded to the walls thereof. The pipe has thin walls made from an alloy, preferably stainless steel, with nozzles affixed at various points along the piping. A plurality of pilot holes are provided at each nozzle location and the edges of each pilot hole are deformed inwardly by a punch so that more surface area is provided for threading the walls of the pilot hole. Preferably, the pilot hole has been reamed after punching and before the threads are made. An atomizing nozzle is mated with the threads on the punched and reamed hole. Seals are to be placed between the nozzle and the exterior piping surfaces.

14 Claims, 2 Drawing Sheets

METHOD OF MAKING AN AEROSOL NOZZLE ASSEMBLY

This application is a continuation of application Ser. No. 302,026, filed Jan. 25, 1989, now abandoned.

BACKGROUND OF THE INVENTION

The present invention relates to water aerosol or fog-generating systems, and more particularly, to a method of attaching an aerosol nozzle to a thin-walled pipe in such systems.

Water-aerosol or fog-generating systems allow one to better control the environment. It enables users to cool or humidify the air, as well as to control temperatures and minimize dust. Some systems administer chemical concentrates which may perform pest and disease control, and tissue culture and foliar feeding. The applications are limitless and each is due to one powerful environmental control resource—natural fog.

For purposes of the present application, aerosol or fog-generating systems basically comprise an atomizing nozzle, a pipe, and a compressor. The compressor introduces water under pressure through the piping and ultimately through a port in the atomizing nozzles. The nozzles are commonly equidistantly spaced at points along the piping. Each nozzle is affixed to the piping when positioned in a pilot hole drilled through the pipe wall. The aerosol or fog is commonly directed radially from the concentric axis of the piping.

The fog-generating industry is continuously searching for the most effective and economical material for constructing system piping. Finding the perfect balance between performance and cost has proven very difficult. Currently, two common piping materials are employed. The first is polyvinylchloride (PVC) and the second is brass.

In the case of PVC piping, a schedule 80 pipe is normally used. It provides sufficient strength and wall thickness for threading the walls of pilot holes so the nozzles can be affixed at each pilot hole. However, the PVC piping has been a difficult material to maintain due to inherent weaknesses in the manufacturer/extrusion process and the pipe's inability to handle hydraulic shock. Moreover, it deteriorates because of ultra-violet light and has the practical limitation of operating at pressures no greater than 600 pounds per square inch. PVC is, however, an ideal material from the standpoint of being non-corrosive, inexpensive, and easy to machine.

The brass piping is typically schedule 40, which has a reduced wall thickness but a higher strength than the typical PVC pipe. The brass piping has the advantage of being of high strength, high reliability, and thus has a higher operating pressure capacity. Schedule 40 brass piping is capable of operating at pressures much greater than 1000 pounds per square inch. The disadvantage of brass piping is that it is extremely costly and heavy. The great weight of brass piping results in higher transportation costs and in additional problems in suspending and supporting the system when the fog-generating system is installed.

Because of the drawbacks of using PVC or brass piping materials, the fog-generating industry has continuously sought for a thin-walled, but high strength, non-corrosive piping material. The material considered to be the most practical to obtain such goals is stainless steel. Stainless steel provides structural integrity sufficient to eliminate deterioration caused by hydraulic shock and ultra-violet light. It also has operating pressures at least as great as 1000 pounds per square inch while still having small thicknesses. Moreover, the use of stainless steel in a fog-generating system would provide the inherent rigidity to eliminate any elaborate support or suspension system which historically has been required by the heavy weight of brass piping.

As far as strength is concerned, it has been determined that a stainless steel pipe with a wall thickness as small as 0.035 inch is ideal. That is so because the weight is actually less than a PVC system, but its strength was far in excess. In fact, a stainless steel pipe with a 0.035 inch wall thickness has a pressure capacity well in excess of 1000 pounds per square inch. A difficulty arose because the pipe thickness was so small that there was not enough surface area for adequately threading the pilot hole for affixing the atomizing nozzle. Moreover, due to the curvature of tubular piping, the threads may be interrupted and thus they did not rigidly hold the atomizing nozzle to the piping. At a minimum, some piping material was not being used to hold the nozzle.

The industry routinely handled the problem of affixing the atomizing nozzle to the pipe by resorting to various welding techniques. Various types of female receptacle fittings were developed which could be welded into the pipe and which would then ultimately receive the atomizing nozzle. This process proved to be very costly in terms of both the additional fitting required and the welding process itself. Moreover, welding is a dirty process, causing internal oxidation which leaves residual contamination in the piping system. Residual contamination in a fog-generating system could render the system inoperable. A nozzle may have an orifice size as small as 0.008 inch. Therefore, the orifice must remain free from residual contamination to avoid repeated and frequent clogging or blocking. Moreover, such small orifice sizes require 10 micron filtration as well as elaborate water treatment and Ph control systems to provide reliable operation. Many in the industry have gone through the time and expense of putting filters on each individual nozzle to compensate for the inherent impurities which have plagued their fog-generating systems. Lastly, welding has been proven to be inherently unreliable because the welded areas have been plagued with joint failures.

Another problem associated with fog-generating systems which must be overcome by the present invention are the forces by inherent water hammer/hydraulic transient phenomena. These phenomena are caused by operation of high pressure pumps, high fluid velocities, and the frequent on/off cycling required. A nozzle and pipe assembly must be sufficiently rigid to withstand these sudden and high destructive forces.

Thus, there remains the need for the use of thin-walled piping, preferably made from a material like stainless steel, capable of withstanding an inexpensive but reliable method for affixing the atomizing nozzle to the pipe. Preferably, a method can be devised whereby welding would no longer be necessary and the piping systems would remain free from impurities.

The present invention increases the apparent thickness of the pipe so that it is capable of having enough threading to rigidly support existing atomizing nozzles within the piping wall. Moreover, the present invention decreases the chance of having interrupted threads by increasing the radius of curvature at the threaded portion of the piping about the pilot hole. The system requires no welding and thus remains relatively free from impurities. The techniques of the present invention allow the use of thin-walled piping made from alloys such as stainless steel which reduce the cost of present fog-generating systems. Also, the present invention includes a seal about the atomizer nozzle to prevent any dissipation of pressure between the threaded surfaces of the pipe and nozzle. Moreover, the seal absorbs inherent water hammer/hydraulic transient forces which are characteristic of fog-generating systems.

Other objects, features and advantages of the present invention will become apparent from the detailed description of the preferred embodiments which follows, when considered together with the attached figures and claims.

SUMMARY OF THE INVENTION

There has been provided, in accordance with the present invention, a method and structure enabling the use of various materials for thin-walled pipes in water aerosol or fog-generating systems. In particular, the present invention discloses a method for assembling a nozzle in such systems where the nozzle directs aerosol perpendicularly to the axial direction of the pipe.

The method disclosed is that of drilling a pilot hole in the wall of the pipe at the location where the nozzle is to be affixed. The pilot hole is of a diameter substantially less than the diameter of the nozzle to be affixed. The next step involves punching the pilot hole so that the diameter of the hole increases and the edges of the pilot hole bend into the interior of the pipe to form a collar, giving the pipe an apparent thickness near the pilot hole greater than the thickness of the pipe elsewhere. The collar is then tapped so that threads are made on the collar and so that the nozzle can be mated or screwed onto the threads of the collar.

Also provided is the additional step of reaming the punched hole to more accurately define the circumference of the hole so that there are minimal tolerances between the diameter of the reamed hole and that of the nozzle to be affixed.

Also provided is the step of placing the piping material in a die before punching the pilot hole. The present invention also discloses a preferred punching tool which has a tapered finger whose end can be directed into the pilot hole. The punching tool has a transitional section which deforms the pilot hole to the diameter of a shaft section. The shaft section has a diameter similar to the threaded portion of the nozzle to be affixed. Preferably, the punch has a sloping base above the shaft to uniformly deform the piping surfaces about the collar to facilitate sealing and to decrease the chance of having interrupted threads.

In a preferred embodiment of the present invention, a seal is positioned between the surfaces of the piping and collar and the nozzle.

DESCRIPTION OF THE PREFERRED EMBODIMENT

Figure 1:
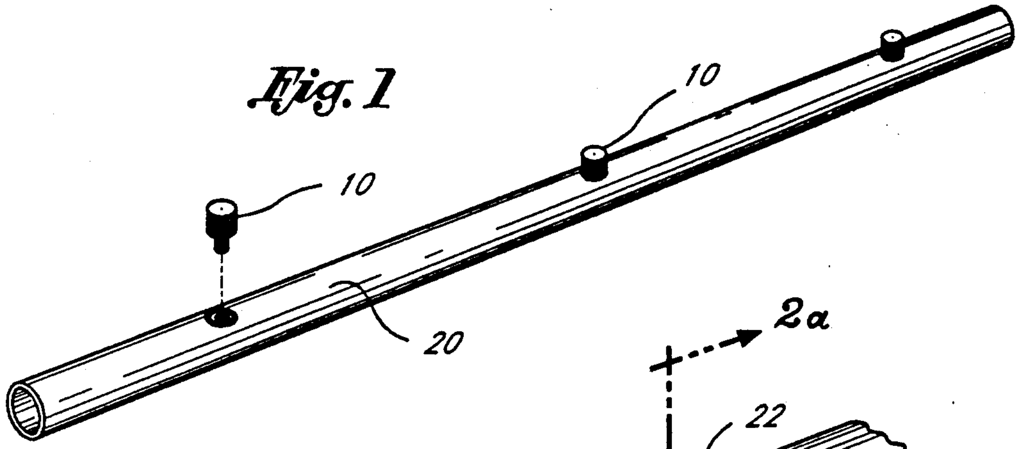
FIG. 1 is a perspective view of a segment of piping in a fog-generating system having three atomizing nozzles.

FIG. 1 discloses a segment of a fog-generating system showing three aerosol nozzles 10. Each of the nozzles 10 are affixed to the walls of pipe 20. It is understood that the pipe 20 can be of various lengths and configurations depending upon the space sought to be covered by the fog-generating system. The segment shown in FIG. 1 is just representative of any segment having a plurality of nozzles 10.

The pipe 20 is in fluid communication with a compressor and a water source (not shown). The water is subjected to high pressure, typically in excess of 1000 pounds per square inch so that a fog emanates from the ports 12 via the passage 14 of nozzle 10. See FIG. 6. The system varies in complexity depending upon the objectives of the user and the environment sought to be altered. Though the industry employs various materials in manufacturing the pipe, typically brass and PVC is used as discussed. However, many recognize that materials like stainless steel would be the most advantageous if they were thin walled. The present invention is concerned primarily with facilitating the use of thin-walled stainless steel pipes by making threading possible so that the nozzle 10, despite being subjected to high pressures in excess of 1000 pounds per square inch, remains snugly fastened to piping 20. However, the present invention is applicable to pipe made from various alloys including stainless steel.

Figure 6:
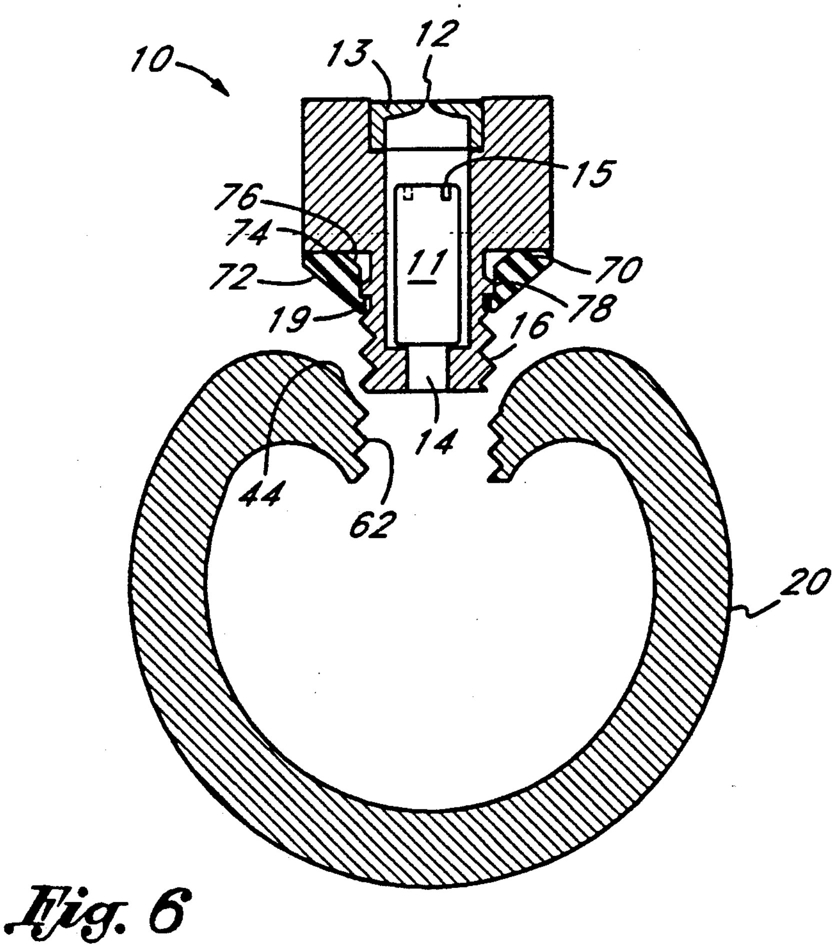
FIG. 6 is a cross-sectional view of the atomizing nozzle as it is being screwed into the threaded pilot hole wherein a seal has been placed about the nozzle.

As shown in FIG. 6, passage 14 travels from the inner end 18 to the top of the nozzle head at port 12. A nozzle must have at least one passage to allow the flow of the fog to the atmosphere.

Figure 2:
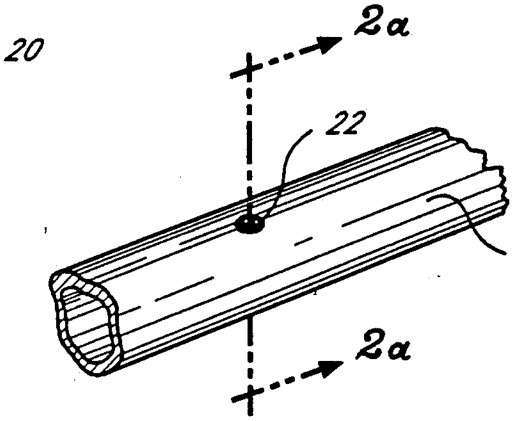
FIG. 2 is a perspective view of a section of the piping showing a pilot hole having no atomizing nozzle therein.

FIG. 2 discloses any segment of the piping 20 of FIG. 1 having a pilot hole 22 drilled through one side of the piping 20. The pilot hole 22 is at each location where a nozzle 10 will be fixed. Pilot hole 22 can be made by any suitable method, preferably by drilling. The diameter of the hole 22 is substantially less than the diameter of the threaded portion 16 of nozzle 10. See FIG. 6.

Figure 2A:
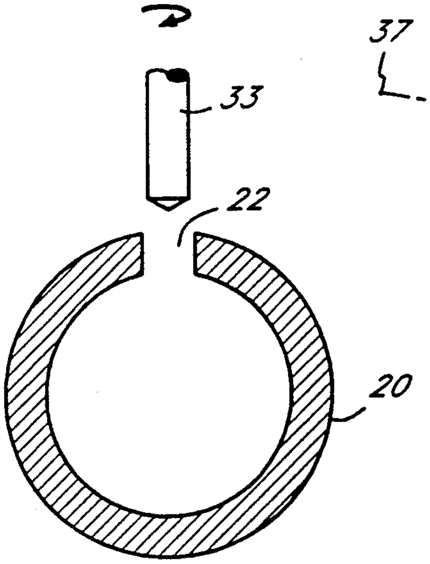
FIG. 2*a* is a cross-sectional view taken along the line 2*a* in FIG. 2 with the drill bit exiting the pilot hole.

FIG. 2*a* is a cross-sectional view of the piping 20 at the plane along 2*a* in FIG. 2. The plane is through the concentric axis of the pilot hole 22. The pilot hole 22 is shown after it has been drilled by a drill bit 23 but before any threading has been done. In FIG. 2*a*, the pipe could theoretically be of various thicknesses, however, the present invention is concerned with thicknesses which are inadequate to have a plurality of threads so as to rigidly hold nozzle 10 in place but adequate enough to contain pressures greater than 1000 pounds per square inch. Thicknesses in the order of 0.035 inch in stainless steel pipes are adequate to hold pressures in excess of those required to generate fog, particularly above 1000 pounds per square inch. However, that small thickness cannot be sufficiently threaded to affix the nozzle 10. The present invention has applicability to pipes as thin as 0.005 to 0.25 inch, but is here applied to a thickness of approximately 0.035 inch.

Figure 3:
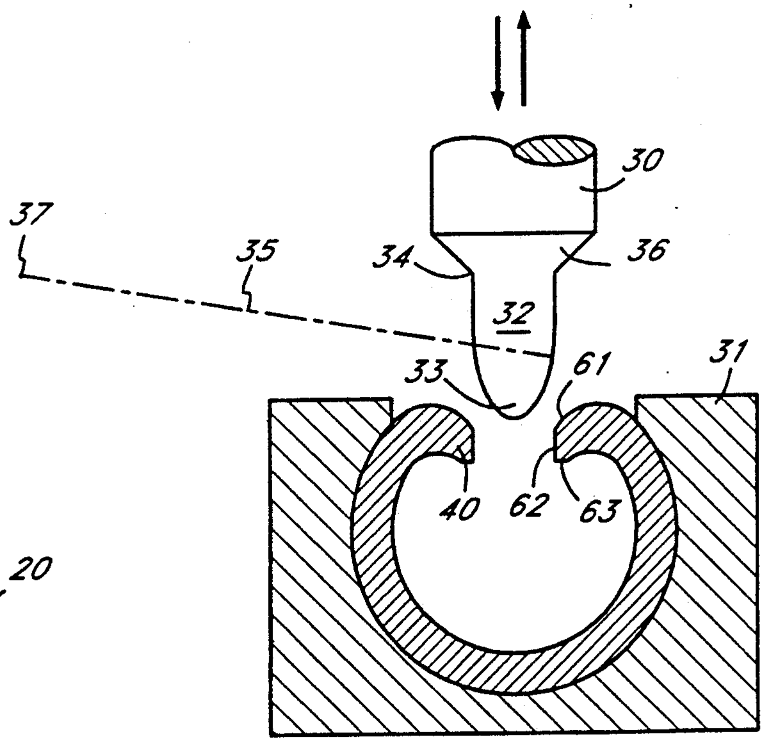
FIG. 3 is a cross-sectional view as in FIG. 2*a* wherein the piping is placed within a die and a punch has been driven into the pilot hole.

Referring to FIG. 3, a punch 30 has been used to enlarge the pilot hole 22 and form a collar 40. The pipe is placed in a die 31 shaped to receive the pipe and support it externally, to prevent crimp or collapse due to the force exerted by the punch 30. Although there is no physical support structure within the thin-walled tubing 20, the die 31 prevents the tube wall from bulging outwards and thereby helps prevent internal collapse as well.

In addition, the punch is shaped to minimize the force required in the punching step and to facilitate withdrawal of the punch. More specifically, the punch has an elongated, somewhat bullet-shaped finger 32 with a finger tip 33 that fits into the pilot hole 22. The profile of the side wall of the punch finger 32 curves to a shaft section 34 having a diameter substantially similar to the minor diameter of the threaded portion 16 of nozzle 10.

It has been found that a preferred profile of the curved side wall is a circular segment having a radius much larger than the radii of the tool finger which are perpendicular to the tool longitudinal axis. The profile is intended to mean that side wall of the finger as viewed in the plane of the paper, which includes the longitudinal axis of the tool. Preferably, the center of the radii of curvature is in a plane approximately at the intersection of the section 34 and the base 36. A schematic example of such is illustrated in FIG. 3, wherein a radius of curvature 35 is shown extending from a centerpoint 37 for the right side of the tool finger profile, as viewed in FIG. 3. The length of that radius of curvature 35 is related to the diameter of the hole 22 and the depth to which the tool finger can penetrate the tube, which is a little less than the inner diameter of the tube 20. The tip of the tool does not bottom-out against the inner wall of the tube opposite from the hole 22. Thus, the length of the radius of curvature of the finger profile is such that the tip end of the finger is small enough to enter the hole 22, but not bottom out at the bottom of the tool stroke.

The bullet or convex shape of the punch finger profile appears to require significantly less force to form the collar than does a tool with a straight taper, i.e., a conical or frusto-conical shape. Thus, thin-walled tubing does not collapse when the collar is formed. Also, the bullet-shaped tool seems to be much easier to withdraw. This desired shape is believed to be due to the "angle of the attack" of the punch, vis-a-vis the material, which is constantly changing due to the radius of the punch profile. This results in a constantly changing force required to move the punch through its stroke and during contact with the material. Initially, the force to move the punch is downward, but gradually and constantly, through the stroke, the resulting force is increasingly outward and decreasingly downward.

Another factor concerning the desired tool shape is that the inherent strength or resistance of the tubing related to the downward punch force or pressure is greater when the work is initiated. As the strength of the tubing relative to the work to be done decreases, the imbalance is offset by the constantly increasing side or outward force. Thus, the overall effect seems to be that downward forces are constantly decreasing and outward forces are increasing.

Another advantage of the increasingly outward force provided by the curved profile of the tool finger is that the thickness of the collar 40 tends to be maintained rather than causing the collar to elongate and become too thin to support a usable thread.

An example of a tool used for forming a version of tubing scheduled for production may be helpful for a better understanding of the invention. With a tool having a diameter at section 34 of 0.156 inches and a length of 0.320 inches from the section 34 to the tool tip 33, the radius of curvature 35 for the tool side wall profile was 1.125 inches. Thus, in that example, the radius of curvature is more than seven times greater than the tool diameter at section 34. With this arrangement, the hole formed is almost cylindrical, such that only a small amount of material is moved in reaming the hole, as discussed below.

Another important feature of the preferred punch 30 is the sloping base 36 immediately above the shaft section 34. The sloping base is dimensioned and sloped at an angle such that it can control the shape of the collar 40 adjacent to the outside of pipe 20. It is preferred that the sloping base 36 be at approximately 45 degrees relative to the shaft section 34. That, in turn, gives the collar a 45 degree slope downwardly relative to the outside of pipe 20 forming a uniform seating 44 for the nozzle. The importance of this portion of the deformation process will be apparent when a seal 70 is selected. See FIG. 6.

Figure 5:
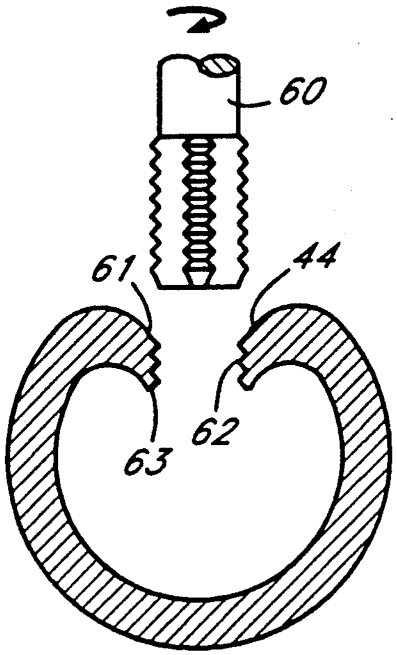
FIG. 5 is a cross-sectional view as in FIG. 2*a* wherein a tap is placed within the reamed hole for making threads.

The punching step performs another critical deformation in the piping 20. As shown in FIG. 5, it forms a uniform cylindrical area for threading, so it is as if the threading is being done to a flat piece. That is, at the upper and lower extremities, 61 and 63 respectively, there is a uniform amount of piping material about the concentric axis of the cylindrical threaded surface area 62. See FIG. 5. This eliminates the possibility of having an interrupted thread common with threading holes in piping using small pitched threads. At a minimum, it eliminates having some piping material which cannot be threaded and in no way assists in holding nozzle 10 rigidly.

Figure 4:
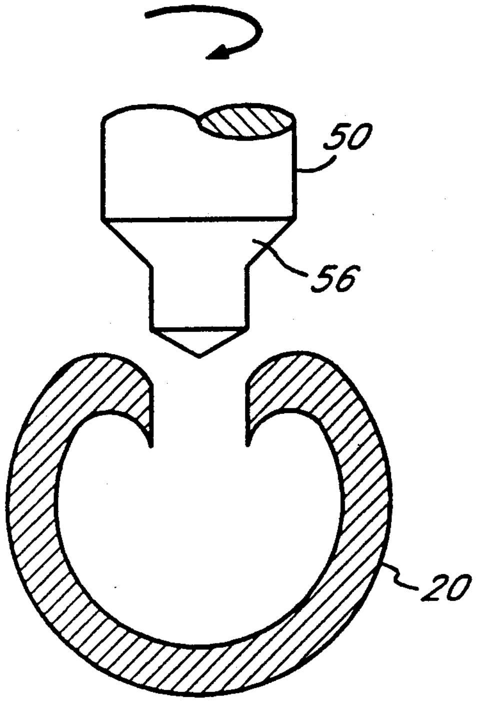
FIG. 4 is a cross-sectional view as in FIG. 2*a* wherein the pilot hole is being reamed.

FIG. 4 shows a reamer 50 sent through the punched hole of FIG. 3. The reamer 50 is a typical spade drill bit which is preferred, though other types of reamers could be used. The preferred reamer also has a sloping base 56 similar to 36 of punch 30. Reaming is an additional step which more precisely widens the width of the punched hole so that it can be within specified tolerances. If the punch 30 was deforming the pilot hole 22 so precisely that matching threads could be made immediately thereafter, the reaming process need not take place. With the curved tool profile described above, the hole formed is not completely cylindrical such that a small amount of material may need to be displaced at the bottom of the hole. The curved profile described requires less reaming than does a tool with a straight taper profile.

FIG. 5 shows a tap 60 making the threads in the punched pilot hole 22, preferably after the hole has been reamed to the specified tolerances. The surface area 62 for threading can now be seen to have increased substantially compared to the thickness of the pipe 20. With the use of stainless-steel piping, the increased threading surface area 62 is critical and one of the significant advantages of the present invention.

For example, as applied to a stainless steel pipe having a thickness of approximately 0.035 inch, the threading surface length can easily be increased to 0.05 to 0.11 inch. Thus, the length of the threaded portion on the collar 40 can be substantially 1.4 to 3.1 times the thickness of the pipe 20. Assuming a thread having a pitch of 0.035 inch is employed, the number of uninterrupted threads is increased from almost one to two or possibly three. If three full uninterrupted threads can be made, the nozzle 10 and piping 20 achieve full bolt strength.

Without the use of the present invention, a 0.035 inch thick pipe could not even sustain one uninterrupted thread having a pitch of the same thickness because of the small radius of curvature of the piping. Tests have shown that one thread was grossly inadequately and a plurality of threads was required to affix the nozzle rigidly so it can withstand being subjected to high pressure.

FIG. 6 shows the atomizing nozzle 10 screwed onto the pipe 20. Preferably, the threaded portion 16 of nozzle 10 is as long as or greater than the length of the surface area 62 of collar 40. In other words, the inner end 18 of the nozzle 10 will fall below the tip 63 of collar 40 when the nozzle has been installed into the piping. This assures that each thread made on collar 40 will be mated with a thread on the nozzle 10, thus providing a secure fitting.

The nozzle 10 may be of a type commercially available, and can be made from various metals or alloys, usually from any non-decaying material such as brass. The atomizing nozzle shown in the figures is typical of the kind manufactured by Baumac International, known as the MicroMist Systems M8 aerosol nozzle. For the sake of completeness, the interior of that nozzle is shown, which contains a plunger 11 and orifice disc 13. The plunger has two notches 15 in its upper portion which cause atomization of the liquid in coniunction with the orifice 12 in the disc 13.

Sandwiched between the nozzle 10 and the pipe 20 is a seal 70. The seal is required for the high pressure and high impact resistant sealing of the nozzle. The seal aids the nozzle in overcoming hydraulic shock common in fog-generating systems. The seal is basically circular and has an interior diameter sufficient to allow the threaded portion 16 of the nozzle to protrude therethrough. The seal used in the nozzle assembly disclosed in FIG. 6 is shown in FIG. 7 and has a sloping face 72 on one axial end. That sloping face 72 corresponds with the sloping base 36 of the punch 30 and thus the seating 44 of the collar 40. That provides a snug seal against the pipe 20. The seal 70 preferably is contoured to engage with the MicroMist M8 nozzle. Ledge 74 engages with the underside surface of nozzle 10 and interior sloping face 76 is spaced from the underside shoulder of the nozzle. The neck 78 of the seal interferes slightly with the nozzle threads when the seal is placed on the nozzle. When the nozzle 10 is tightly rotated onto the threads of collar 40, the seal 70 acts like a spring or lock washer that prevents the nozzle from becoming loose. The compressive forces exerted onto the seal cause equal but opposite forces to be exerted against the underside surfaces of the nozzle 10 and thus against the coacting threads of the collar 40 and nozzle 10. The seal 70 can be made from any synthetic pliable material, such as a synthetic rubber or plastic. Preferably, the seal is made from nylon, teflon or delrin.

Whatever the geometric shape of the seal 70, the primary importance is that it provide the necessary rigidity and strength for the nozzle to overcome the sudden and high forces exerted upon it.

Although this invention has been described in terms of certain preferred embodiments, other embodiments that are apparent to those of ordinary skill in the art are also within the scope of this invention. Accordingly, the scope of the invention is intended to be defined only by the appended claims.

What is claimed is:

1. A method of attaching a nozzle in a sidewall of a rigid metal pipe in an aerosol-generating system where said nozzle has a body with a threaded exterior and a very small interior atomizing orifice, and where said pipe has thin walls but which are capable of handling high liquid pressure of an aerosol-generating system; said method comprising the steps of:

drilling a pilot hole in the wall of said metal pipe;

deforming the pilot hole with a punch so that its diameter is permanently increased to a predetermined size and the metal edges of said pilot hole are deformed into the interior of said pipe to form a collar of a length substantially greater than the thickness of the pipe;

removing said punch to yield a hole having a diameter which is substantially said predetermined size;

tapping threads in the collar so that the threads extend a length which is substantially greater than the thickness of the pipe; and screwing a threaded atomizing nozzle into the threads of said collar wherein the relationship between the diameter and the pitch of the threads on the nozzle and in the collar, and in the diameter and wall thickness of said pipe is such that threads could not be formed directly in the pipe sidewalls simply by said drilling and tapping steps sufficient to reliably hold said nozzle in position in the pipe when the pipe and nozzle are subjected to the high-liquid pressure used in an aerosol-generating system.

2. The method of claim 1, wherein said deforming step is performed by punching and said method further comprises the step of reaming the punched hole, before said tapping; to more accurately define the circumference of said hole.

3. The method of claim 1, wherein said deforming step is performed by punching and said method further comprises the step of placing the piping material in a supporting die before punching the pilot hole.

4. The method of claim 1, further comprising the step of placing a seal about said atomizing nozzle to prevent the passage of fluid through said threads and to assist the nozzle from overcoming forces caused by hydraulic shock.

5. The method of claim 1, wherein said deforming step is performed by punching with a punching tool having a convex profile.

6. The method of claim 5, wherein said punching step is performed with a tool having a bullet shape.

7. The method of claim 5, wherein said punching step is performed with a tool having an elongated finger with a curved profile which is a segment of a circle formed on a radius much longer than that of the radius of the tool which is perpendicular to the longitudinal axis of the tool.

8. The method of claim 1, wherein said tapping step forms threads having a pitch larger than or not much smaller than the wall thickness of said pipe.

9. The method of claim 1, wherein the thread formed by said tapping step is inadequate to support said nozzle if formed directly in the wall of said pipe without said deforming step.

10. An improved method of preparing a pipe for use in assembling a fog generating system having a thin-walled metal pipe and a plurality of atomizing nozzles in fluid communication with said pipe, wherein the method comprises:

drilling a pilot hole through a wall of said pipe;

punching said pilot hole with a punch to a predetermined size to deform permanently the metal edges thereof so that the piping material extends to the interior of said pipe to form a collar about said pilot hole;

removing said punch to yield a hole having a diameter which is substantially said predetermined size; and tapping threads in said collar, wherein the relationship between the diameter and pitch of said threads, and the diameter and wall thickness of said pipe, is sufficient to retain said nozzle relative to said collar upon a fluid pressure within said pipe sufficient to generate fog through said nozzle.

11. The method of claim 10 further comprising screwing said nozzles onto said threads.

12. The method of claim 11, further comprising placing a seal about said nozzle so that said seal is compressed between said nozzle and said pipe thus allowing the seal to act as a lockwasher.

13. A method of attaching an aerosol generating nozzle in a sidewall of a rigid metal pipe where the nozzle has a body with a threaded exterior and an interior atomizing orifice, and where the pipe has wall thickness which is capable of withstanding an internal pressure sufficient to generate an aerosol through the nozzle; the method comprising the steps of:

(a) drilling a pilot hole in the wall of said pipe;

(b) forming a permanent inwardly depending collar having a predetermined size at the pilot hole with a punch, such that the collar has a substantially cylindrical length which is greater than the thickness of the pipe wall, and removing said punch to yield a hole having a diameter which is substantially said predetermined size;

(c) tapping threads in the collar;

(d) deposing a seal between the collar and a threaded atomizing nozzle; and (e) screwing said threaded atomizing nozzle into the threads of the collar to retain the seal between the collar and the nozzle so as to prevent fluid flow between the nozzle and the collar when the pipe and nozzle are subject to a fluid pressure sufficient to generate an aerosol through the nozzle.

14. The method of claim 13, wherein the pipe has a wall thickness between approximately 0.005 inches and approximately 0.035 inches.

* * * * *